United States Patent [19]

Knowles

[11] Patent Number: 5,870,214
[45] Date of Patent: Feb. 9, 1999

[54] FREE SPACE COMMUNICATIONS SYSTEM EMPLOYING LINE OF SIGHT RADIATION

[75] Inventor: Michael Knowles, Surrey, United Kingdom

[73] Assignee: IML Ltd., Liphook Hampshire, United Kingdom

[21] Appl. No.: 750,567

[22] PCT Filed: Jun. 16, 1995

[86] PCT No.: PCT/GB95/01419

§ 371 Date: Feb. 6, 1997

§ 102(e) Date: Feb. 6, 1997

[87] PCT Pub. No.: WO95/34963

PCT Pub. Date: Dec. 21, 1995

[30] Foreign Application Priority Data

Jun. 16, 1994 [GB] United Kingdom .................. 9412031

[51] Int. Cl.⁶ .................................................. H04B 10/00
[52] U.S. Cl. .......................... 359/152; 359/143; 359/172; 340/825.72
[58] Field of Search ..................................... 359/143, 145, 359/147, 156, 157, 172; 455/11.1, 73, 554–555; 370/310, 346, 449; 375/219, 237–239; 340/825.08, 825–72

[56] References Cited

U.S. PATENT DOCUMENTS

Re. 35,449   2/1997   Derks ................................. 340/825.08
4,377,870   3/1983   Anderson et al. ........................... 455/2
5,495,357   2/1996   Osterhout ................................ 359/152
5,570,367   10/1996  Ayanoglu et al. ....................... 370/346

Primary Examiner—Kinfe-Michael Negash
Attorney, Agent, or Firm—Jacobson, Price, Holman & Stern, PLLC

[57] ABSTRACT

A signal transmission system comprises a transmitter arranged to transmit a coded signal as a series of pulses of line of sight radiation having a predetermined minimum interval therebetween, a receiver responsive to such radiated pulses received at a corresponding minimum interval, and a plurality of repeater devices. Each repeater device comprises a radiation receiving element, a radiation transmitting element, and means responsive to receipt of a pulse of transmitted energy by said receiving element for causing said transmitting element to emit a corresponding pulse of transmitted energy and for causing said receiving element to be disabled for a predetermined period of time corresponding to at least a multiple of the duration of the pulse transmitted by said transmitting element. A plurality of the repeater devices can thus be arrayed between said transmitter and receiver to provide a plurality of line of sight radiation propagation paths with a plurality of repeaters each in line of sight of the transmitter and/or other repeaters and with the receiver in line of sight of a plurality of said repeaters so that random interruption of the signal propagation paths does not interrupt the transmitted signal. Each repeater may comprise its own transmitter and key pad to provide an audience polling system.

5 Claims, 4 Drawing Sheets

FREE SPACE COMMUNICATIONS SYSTEM EMPLOYING LINE OF SIGHT RADIATION

FIELD OF THE INVENTION

This invention concerns signalling devices employing line of sight radiation, and more especially, but not exclusively, to infra red transmitters and receivers of the kind that are designed to communicate using coded signals.

BACKGROUND OF THE INVENTION

Such devices have particular application in circumstances where relatively short range line of sight communication is appropriate, and avoid disadvantages inherent in, for example, radio communication or the use of cables. They do have the disadvantage, however, that signal communication is interrupted when there is no direct line of sight between transmitter and receiver. Where relatively short range communication is involved, it has been proposed to overcome the latter disadvantage by providing infra red reflectors or repeaters to enable transmission via an indirect path. This presupposes however that the path or paths of transmission can be planned in advance and does not allow for possible random interruption of signal paths.

One known communication system, for example, makes use of a communication link for polling a number of hand held keypad devices used in gathering opinions from delegates at meetings.

At such a meeting, each delegate is equipped with a hand held keypad. The presenter displays a question on a video screen and the delegates enter their response on their keypad. Each keypad responds to a different address and, as the controlling computer polls the keypad addresses, they each return their delegate's response.

Such a system uses serial bi-directional communications over cables. Most conferences are held in venues which do not provide group response systems so that such a system would be hired in for the duration and installed on a temporary basis. The installation of such a system is labour intensive in view of the requirement for the provision of cabling, and thus a system that avoided the use of cables would provide a significant advance on the state of the art.

WO-A-91 07028 discloses an arrangement wherein a plurality of repeaters are arranged to provide line-of-sight communication between a transmitter and a receiver located within a given area. The repeaters act as passive repeaters of pulses of radiated energy, and are arranged to incorporate a lock-out period wherein each repeater is disabled for a predetermined period of time following its response to a received pulse. Such an arrangement enables line-of-sight propagation of a pulsed signal via a plurality of possible propagation paths, without ambiguity caused by a repeater responding to a pulse that it has already transmitted. In such an arrangement, however, the repeaters, which are intended to be arranged at a fixed spacing, act merely passively to propagate radiation between dedicated transmitters and receivers.

U.S. Pat. No. 5,099,346 describes a system for the propagation of line-of-sight radiation between devices that can receive and transmit in alternative modes in which they act either as originating transmitters, or as passive repeaters of a signal transmitted by another device. In this system, however, for a device to act as a repeater it is necessary for a predetermined signal path to be established so that the repetition of signals is via a defined path through a network. For the device to operate, a relatively complicated communications protocol is therefore required.

SUMMARY OF THE INVENTION

It is accordingly an object of the present invention to provide an improved means of line of sight signal transmission that is less susceptible to failure as a result of random blockage of signal paths and that is therefore usable in systems of a kind that has hitherto required the use of radio or direct cabling.

The present invention provides a polling system employing line-of-sight radiation, and a device for use therein, as respectively set out in claim 5 and claim 1.

Further preferred features of the invention will become apparent from the dependent claims taken in conjunction with the following description.

BRIEF DESCRIPTION OF THE DRAWINGS

The invention is illustrated by way of example in the accompanying drawings, in which.

DETAILS

Figure 1:
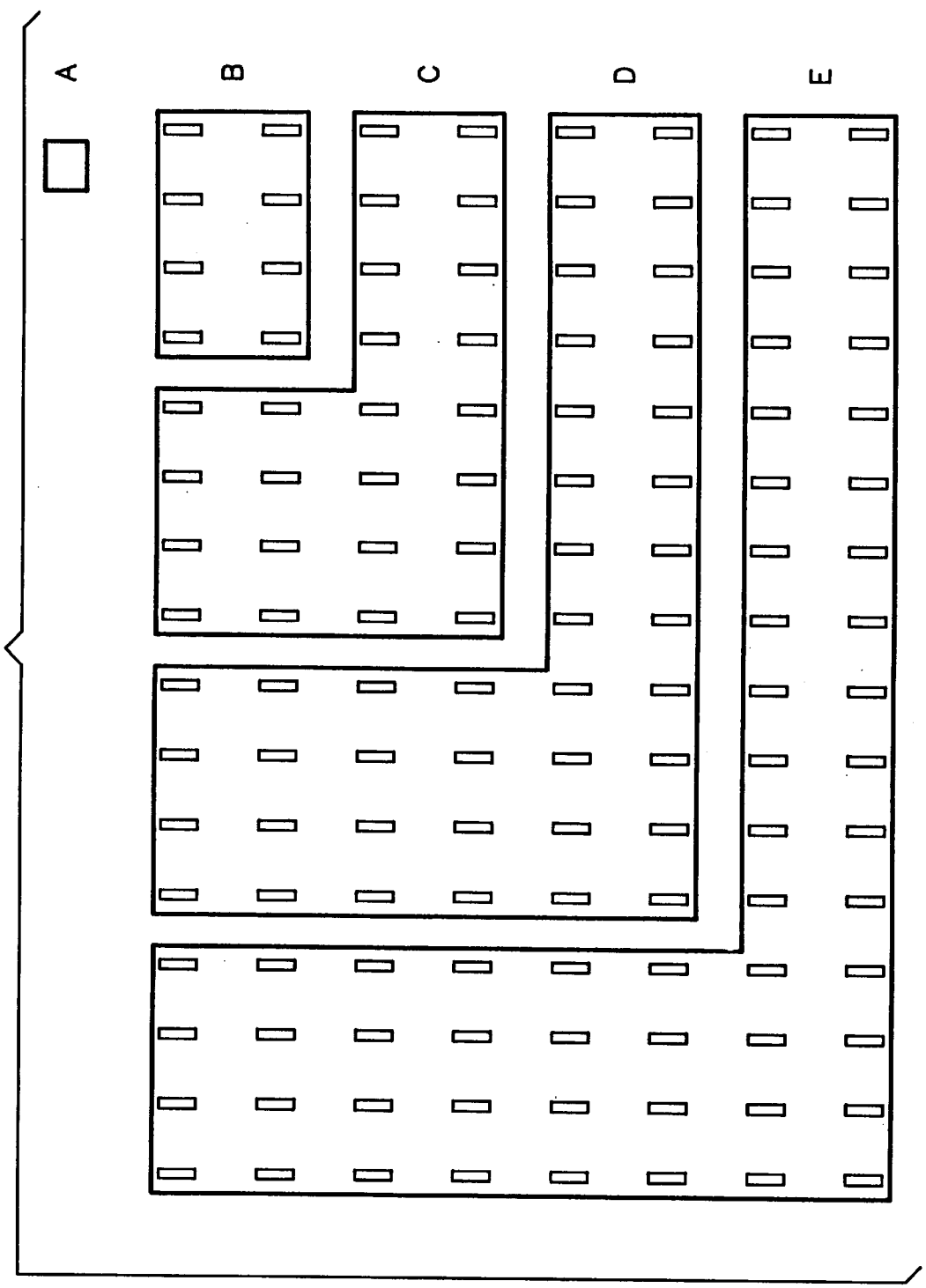
FIG. 1 is a plan view illustrating one arrangement of a signal transmission system according to the invention.

FIG. 1 shows a typical seating plan of a room containing a polling system of the kind described above and embodying a signal transmission system according to the invention utilising infra red links to eliminate the cabling of the known system. Keypads are shown in four regions labelled B, C, D, and E. A transceiver A for polling the keypads is shown in the top right hand corner of the room and the regions indicate the general progression of the communications using the proposed repeater method. The polling command and keypad address first emanate from A and act directly with region B. Region B repeats the signals to region C and so on to region D and then region E. The keypad that is being polled, lets say in region E then radiates its signal to region D which repeats it to region C and so on back to the transceiver A.

The key factors to be considered, to make this method successful, are feedback loops and propagation delays.

Figure 2:
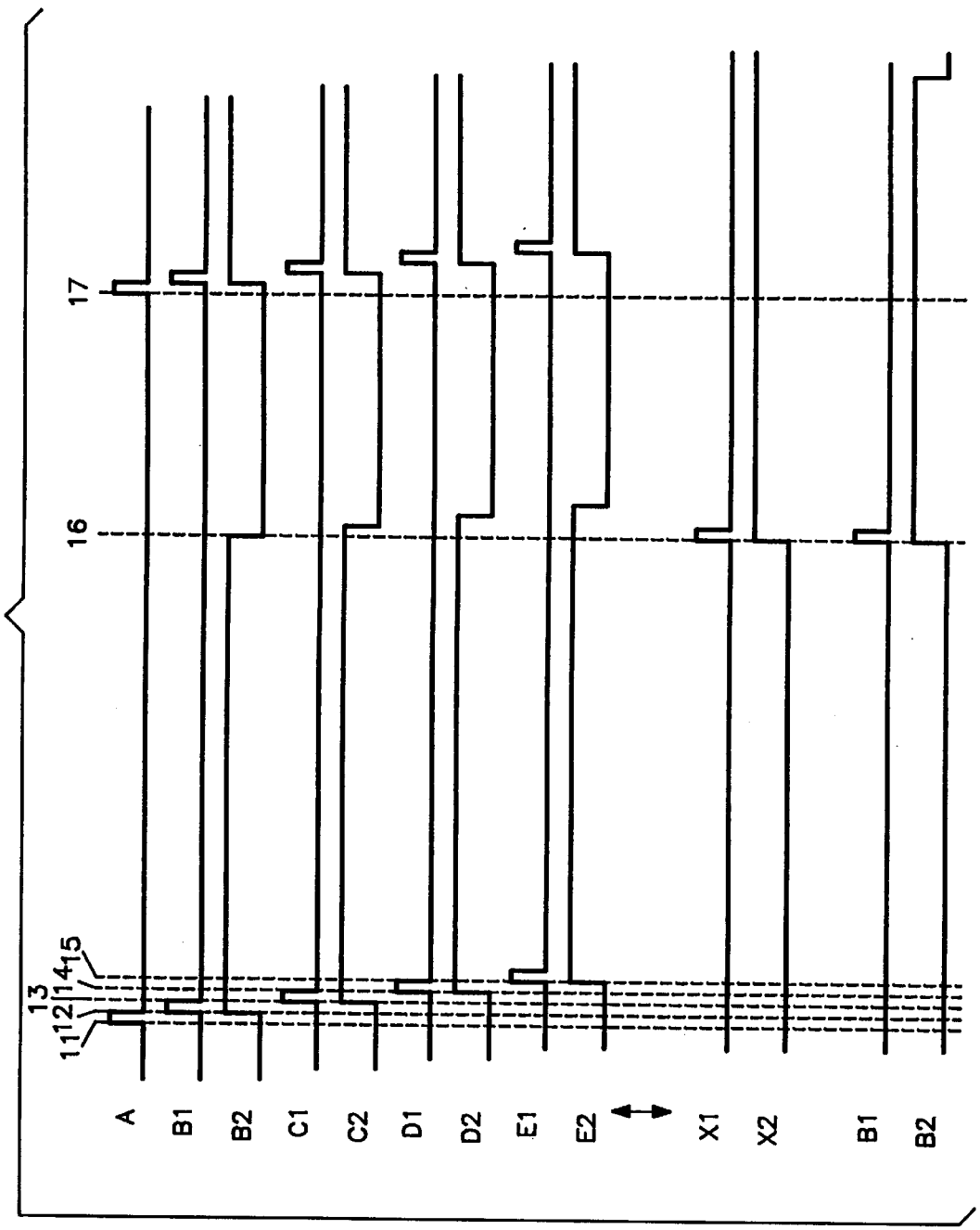
FIG. 2 is a timing diagram illustrating the operation of a system as shown in FIG. 1.

FIG. 2 shows a timing chart with the transceiver signal A being successively delayed through each region B1 in region B, C1 in region C, D1 in region D, E1 in region E at times t1, t2, t3, t4 and t5.

To prevent feedback loops, each repeater has a lockout period B2, C2, D2, E2 which is initiated by a received pulse. Looking at FIG. 2 keypads in region B could be retriggered by keypads in region D. To prevent this the receiving circuit in B is disabled for the lockout period B2.

This strategy works provided that there are not so many propagation stages that keypads could be producing pulses after the lockout period as shown by X1 in FIG. 2.

However as such a key pad would be out of range of keypads that have ended their lockout period this would not be a problem. The lockout period may, for example, be only 4 to 10 times the propagation delay.

Figure 3:
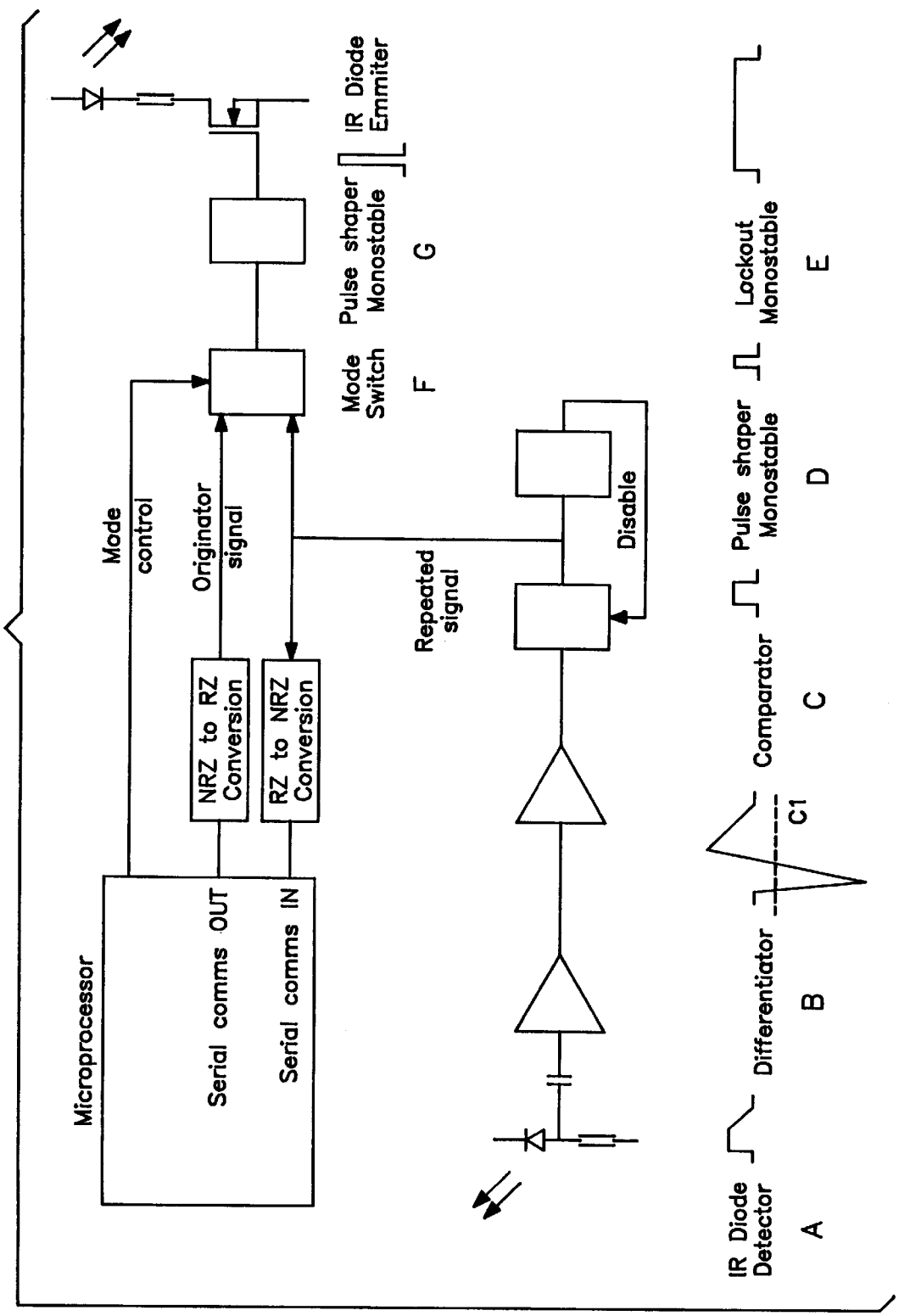
FIG. 3 is a circuit diagram of a repeater of the system of FIG. 1.

FIG. 3 shows how the repeater is implemented using standard electronics techniques.

The received signal at the diode detector A is amplified and differentiated B. The signal is passed through a comparator C with its threshold C1 set above noise levels. The output pulse is then retimed by monostable D to produce a signal for repetition. The lockout monostable E is also triggered by monostable D. Monostable E disables monostable D during the lockout period.

The lockout period is less than or at most equal to the interval between consecutive pulses of a coded signal. As shown in FIG. 2 the lockout period B2 ends at time t6 before the next pulse of transceiver signal A at time t7. Each keypad thus recognises the individual pulses originating from the transceiver whilst ignoring repetitions of the same pulse.

Whilst repeating the transmitted pulses each keypad also decodes the signal via the microprocessor shown in FIG. 3 to determine whether its own address has been transmitted and it should transmit a response to the poll. Such a response includes data input manually via the keypad and stored by the microprocessor as is conventional in the known systems referred to above.

When a keypad is transmitting its delegate's response it changes from repeater mode to originator mode using the mode control line and mode switch F. After it has completed its transmission the keypad returns to repeater mode.

In the illustrated embodiment the normal non-return-to-zero (NRZ) serial data format of the microprocessor is converted to return-to-zero (RZ) serial data format for transmission. This improves the integrity of the signal once it is converted into pulses. The RZ signal is likewise converted to NRZ at the input to the microprocessor.

Figure 4:
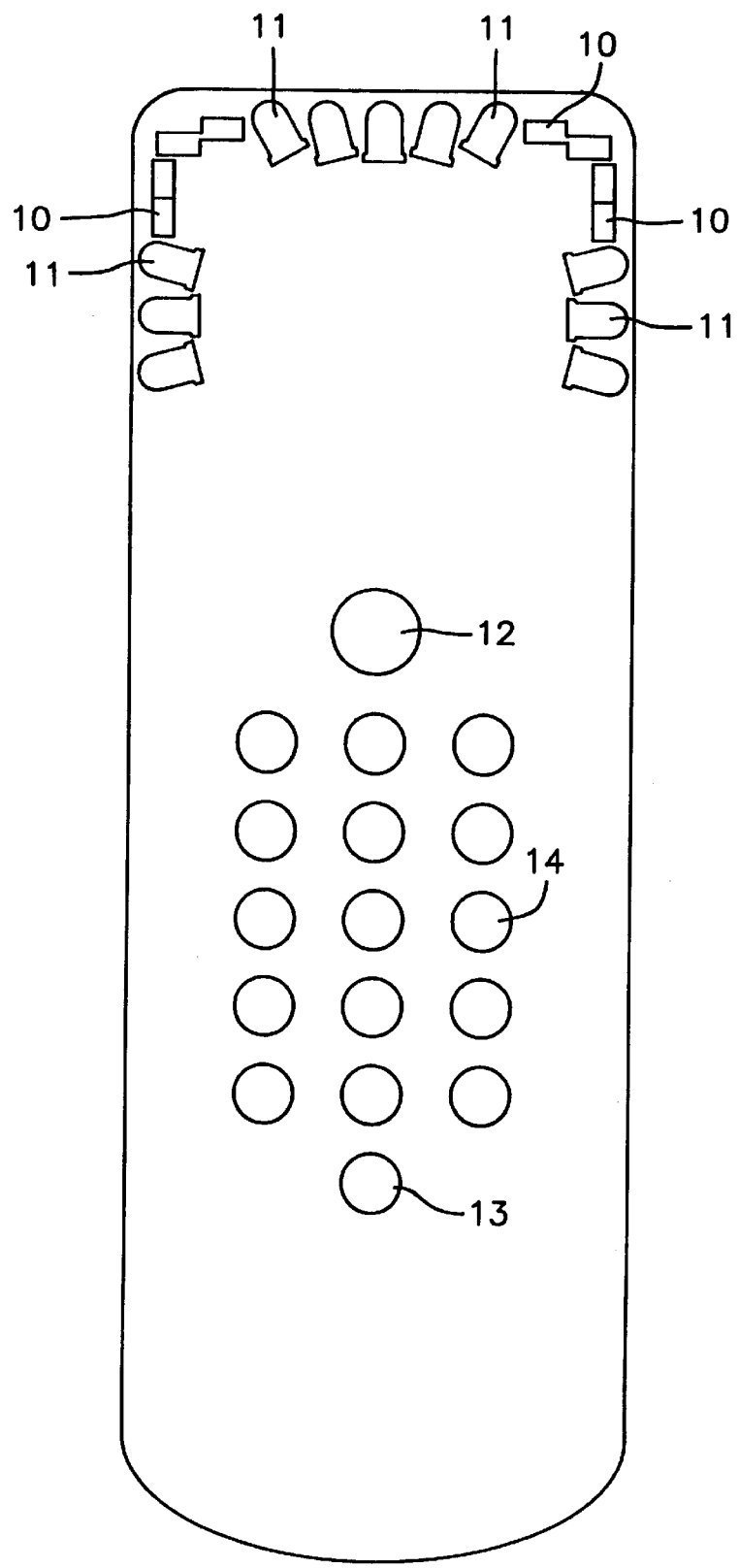
FIG. 4 is a plan view in diagrammatic form of a hand held keypad/repeater unit.

Advantageously each keypad has IR detectors and emitters on its sides as well as the front edge. Such an arrangement is shown in FIG. 4, wherein IR detectors are illustrated at 10 and emitters at 11. This allows the signal to pass across a row of delegates sitting next to each other. In addition to keys 14 for manual input, the keypad may also have a microphone 12 which transmits using infra red and preferably also the repeater method. In the latter case the mode switch F will be set to originator mode upon use of the microphone, for example, in response to actuation of a transmission button 13 associated with the microphone. The keypad is held up to the speaker's mouth when it is being used, hence the importance of sidelooking transceivers which retain their general sideways view when the keypad is held like this. It will be appreciated that alternative means may be provided for the reception of microphone signals, such as dedicated IR receivers at the ends of each row of seating.

I claim:

1. A device for use in an audience polling system, comprising a portable hand-held unit including a key pad (14) for the entry of data, a microprocessor, a radiation transmitting means (11), and a radiation receiving means (10), the said microprocessor being programmed to respond to a pulse-modulated signal received by said radiation receiving means (10) and to cause a pulse-modulated signal to be transmitted by said radiation transmitting means (11), the pulse modulation in each case comprising signal pulses spaced by at least a predetermined interval of time that is greater than a predetermined multiple of the duration of a signal pulse, said device further comprising a mode switching means (F) controlled by said microprocessor for setting said device either in a repeating mode in which pulses received by said radiation receiving means (10) are caused to be repeated by said radiation transmitting means (11) or in a transmitting mode in which data entered via the keypad (14) and stored by the microprocessor is caused to be transmitted as an original pulse-modulated signal and any received pulses are ignored, and the arrangement being such that the microprocessor can store a unique address identifying the particular device, and that when in the repeating mode, upon receipt of each pulse of a said signal the receiving means is disabled for a predetermined period of time greater than a multiple of the duration of the pulse transmitted by said transmitting means (11) and less than said predetermined interval, whereas, upon receipt of a polling signal transmitted by a polling transceiver and containing said unique address, said polling signal is recognised by said microprocessor and the said mode switching means (F) is actuated to set the device in said transmitting mode in order to return an answer signal to said polling transceiver.

2. A device according to claim 1, including a microphone (15) for generating an original signal, and means arranged to set said device as a transmitter of the microphone signal when said microphone is in use.

3. A device according to claim 2, wherein said radiation receiving and transmitting means comprise a plurality of radiation receiving (10) and transmitting (11) elements at least some of which are located on one or more side edges of the device so that radiation can be transmitted sideways along a row of such devices when held in an upright position for use as a microphone.

4. A device according to claim 3 further comprising said transmitting and/or receiving elements along a front edge of the device, when laid at rest.

5. An audience polling system comprising a plurality of devices as claimed in claim 1 and a transceiver (A,FIG. 1) arranged to poll said devices by transmitting for each device a pulse-modulated signal containing the unique address thereof and storing the signal returned by each respective device, the arrangement being such that the said plurality of devices can be arranged in a given area to provide a plurality of line-of-sight radiation propagation paths from said transceiver (A) via a plurality of said devices acting as repeaters to further ones of said devices at boundaries of said area and that the longest propagation path and the response time of each device when acting as a repeater is such that all repeaters in said longest path will have responded to a given pulse from said transceiver within the said predetermined period of time during which the receiving means is disabled.

* * * * *